United States Patent
Kundler et al.

[15] 3,670,227
[45] June 13, 1972

[54] ELECTRICAL AUTOMATIC PILOT

[72] Inventors: Walter Kundler, Kiel; Gerd Hingst, Kiel-Ellerbek, both of Germany

[73] Assignee: Anschutz & Co., G.m.b.H., Kiel-Wik, Germany

[22] Filed: Oct. 13, 1970

[21] Appl. No.: 80,438

[52] U.S. Cl. .............................. 318/581, 318/588, 318/610, 114/144
[51] Int. Cl. ..................................... G05d 1/00, B63h 25/02
[58] Field of Search ................. 318/581, 588, 648, 649, 610; 114/144

[56] References Cited

UNITED STATES PATENTS

| | | | |
|---|---|---|---|
| 2,419,970 | 5/1947 | Roe et al. | 318/581 X |
| 3,301,510 | 1/1967 | Cook | 318/588 |
| 2,801,059 | 7/1957 | Hecht et al. | 318/581 X |

*Primary Examiner*—T. E. Lynch
*Attorney*—Shlesinger, Fitzsimmons & Shlesinger

[57] ABSTRACT

Our invention relates to an automatic pilot for a ship of the type equipped with a gyroscopic compass indicating the true heading of the ship and with a manually adjustable selector set-up in accordance with the selected or desired course. An electrical error signal indicating the difference of the true heading from the selected course controls a trigger circuit which in its turn controls a motor-operable steering gear for actuating the rudder of the ship. As a result, the rudder is so actuated as to keep the error signal to a minimum. For the purpose of our invention a correcting signal is superimposed on the error signal for steering the ship along a track coinciding with a "locating line." This is a line connecting the points in which electro-magnetic waves received from two stationary radio stations have the same phase-angle. The error signal is produced by a PID-network controlled by a radio navigational receiver installed on the ship. As a result, the automatic pilot whose selector has been set up in accordance with the approximate azimuth of the locating line will so steer the ship as to keep the sum of the error signal and the correcting signal to zero. This means, however, that the ship will travel along a track coinciding with the locating line.

9 Claims, 10 Drawing Figures

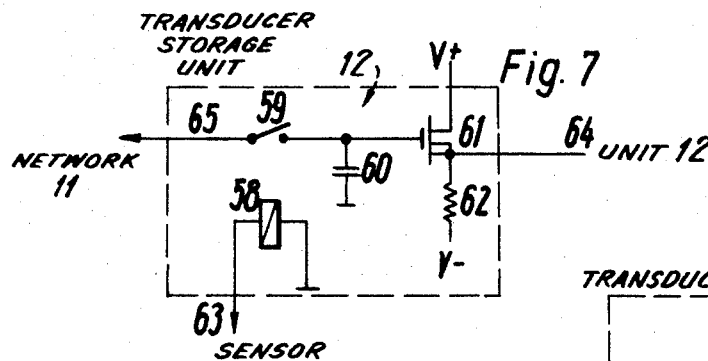
Fig. 7
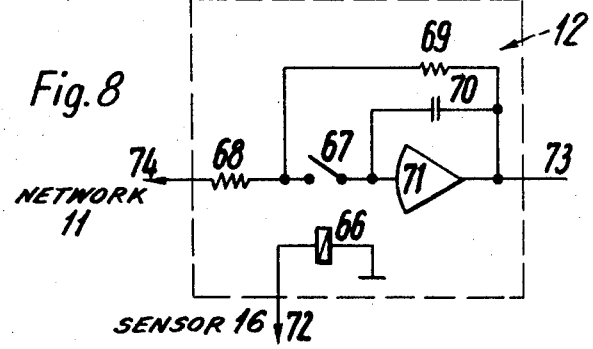
Fig. 8
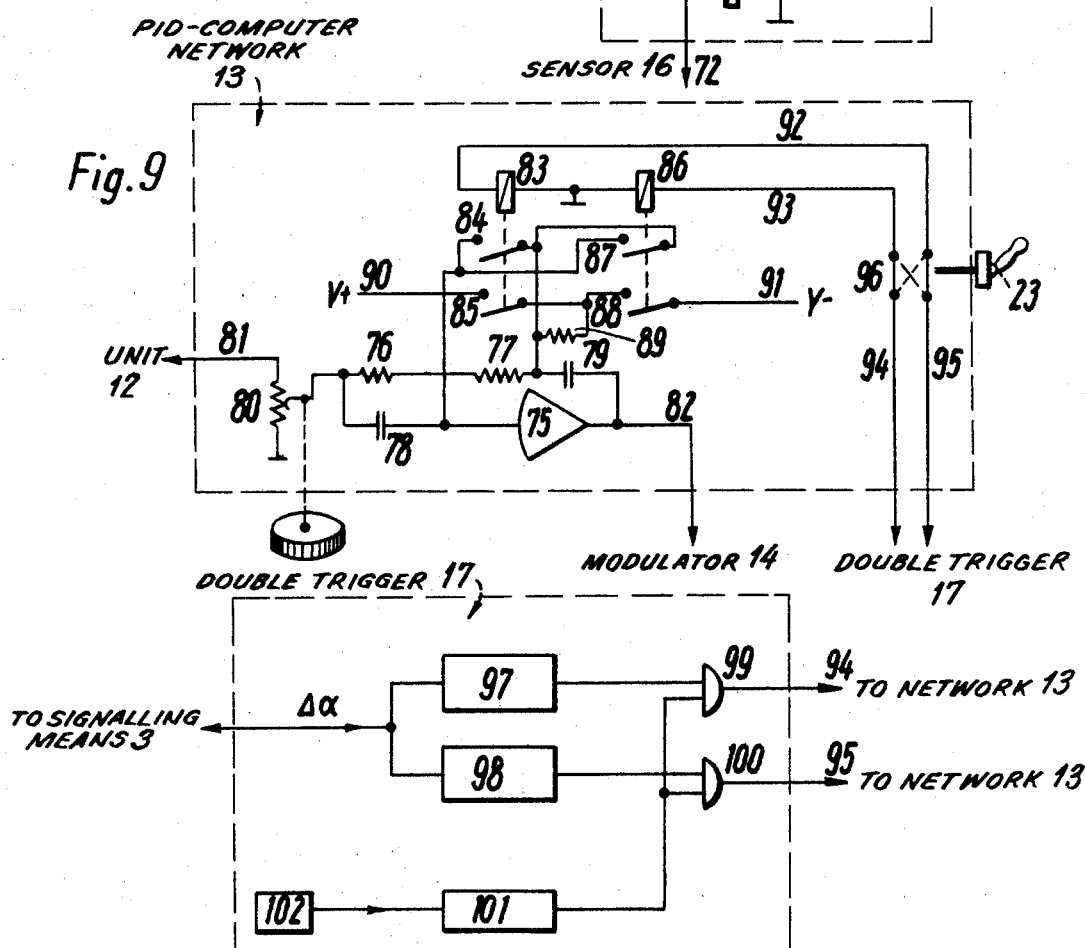
Fig. 9
Fig. 10

ELECTRICAL AUTOMATIC PILOT

Our invention relates to an electrical automatic pilot for a ship of the type equipped with a gyroscopic compass indicating the true heading of the ship, with a course selector manually adjustable in accordance with the desired course or heading of the ship and with signalling means producing an electrical error signal which by means of a trigger circuit so controls a motor-operable steering gear for actuating the rudder of the ship as to minimize the error signal.

Automatic pilots of his type make it possible for a ship to be directed into a desired target area with an accuracy which, however, depends on that of the gyroscopic compass, on the weather, on the current and on the distance travelled by the ship. This accuracy is not adequate for some navigational work, such as oceanic surveying and the laying and sweeping of mines. The permissible error in navigational work of this kind is at the most a few yards. This accuracy can be obtained, for instance, when using navigation by radio. This involves the installation on the ship of a receiver receiving electro-magnetic waves from a number of spaced stationary radio stations located according to a plan. These stations emit synchronized electro-magnetic waves. The waves when reaching the receiver on the ship have a phase-angle from which the position of the ship can be determined. The locus of points on the surface of the earth having the same phase-angle between two super-imposed synchronized electro-magnetic waves emitted from two spaced stations is a hyperbolic curve, called a "locating line" hereinafter.

It is an object of the present invention to provide the automatic pilot of the type described hereinabove with means enabling the pilot to steer the ship on a track coinciding with great accuracy with a "locating line."

It is a further object of the present invention to provide the automatic pilot with a locating line controller which is connected to a radio receiver and produces a correcting signal which is supplied to the course selector and is superimposed on the error signal thereby causing the pilot to steer the ship on the selected locating line.

It is a further object of the invention to provide a locating line controller of the kind just explained which is simple and reliable in operation and can be easily adjusted.

Further objects of our invention will appear from a detailed description of a number of embodiments described hereinafter with reference to the accompanying drawings. It is to be clearly understood, however, that our invention is in no way restricted or limited to such embodiments but is capable of numerous modifications within the scope of the appended claims.

The invention will now be described in detail with reference to the drawings which show by way of example some embodiments thereof.

FIG. 7 is a wiring diagram of the transducer-storage unit diagrammatically indicated in FIG. 2 by block 12;

FIG. 8 is another embodiment of the unit shown in FIG. 7;

FIG. 9 is a wiring diagram of the network of the PID computer network diagrammatically indicated in FIG. 2 by block 13, and FIG. 10 is a wiring diagram of a double trigger, indicated in FIG. 2 by block 17.

FIG. 1 shows how the locating line controller connected a radio navigation receiver 1 co-operates with an automatic pilot and how the flow of the signal currents is directed in the circuits.

Figure 1:
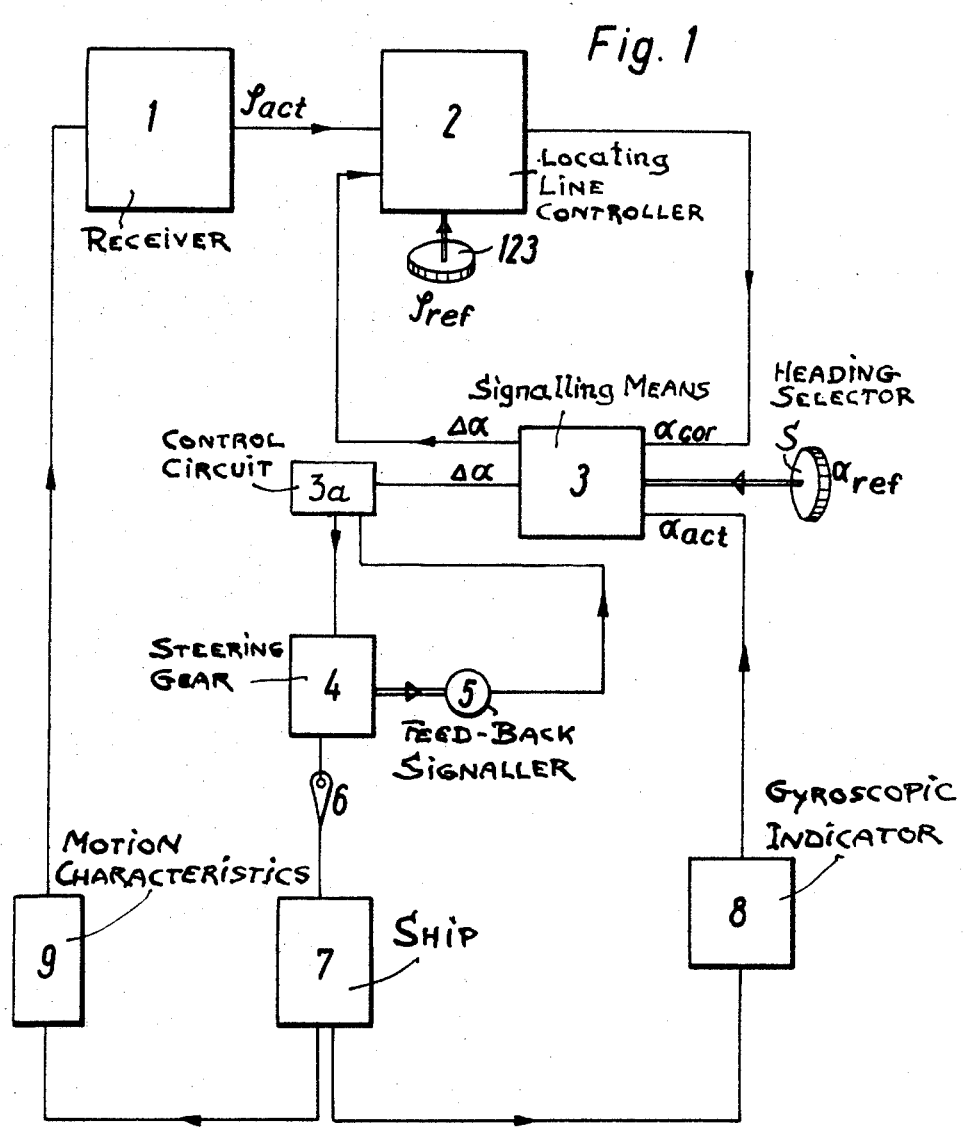
FIG. 1 is a block diagram of an automatic pilot equipped with a locating line controller according to the invention.

The radio navigational receiver 1 is installed on board a ship and receives synchronized electro-magnetic waves from two different transmitter stations. This receiver supplies in a known manner an output signal $\phi_{act}$. The signal represents the phase-angle between the waves received from the stations and is fed to the input end of a group of units shown in FIG. 2, the group being the locating line controller diagrammatically indicated in FIG. 1 by block 2. This controller is manually adjustable by a rotatable button 123, shown in FIGS. 1, 2 and 3, to the reference value $\phi_{ref}$ of the phase-angle of the selected locating line. Hence, it will appear that the operator selects the locating line which is to coincide with the track of the ship by manual rotary adjustment of the button 123. The locating line controller 2 has a second input end to which reference will be made below. The controller 2 supplies at its output end a signal $\alpha_{cor}$ which represents an angle of correction. This signal is fed into the signalling means 3 which are connected with the heading selector S and with the gyroscopic indicator 8. The heading selector has been manually adjusted to a heading $\alpha_{ref}$ which is approximately equal to that between the reference locating line and the meridian at the position of the ship. The signalling means 3 include means which compare the true heading $\alpha_{act}$ measured by the gyroscopic device 8 with a reference value which results from the superposition of the angles $\alpha_{cor}$ and $\alpha_{ref}$ and produce a control error signal $\Delta\alpha$ obtained from this comparison. $\Delta\alpha$ is fed into a second input side of the locating line controller 2. Moreover, the control error signal $\Delta\alpha$ is fed to a control circuit $3a$ of the automatic pilot. The entire control loop of the automatic pilot comprises the gyroscopic indicator 8, the signalling means 3, the control circuit $3a$, the motor-operable steering gear 4, a feed-back signaller 5, a rudder 6, and the ship 7, controlled by this rudder in dependence of its steering characteristics. Due to the displacements to which the rudder 6 is continuously subjected in this circuit by its steering gear 4, the ship is kept on a track in which the actual course or heading $\alpha_{act}$ is substantially equal to the total reference course angle $\alpha_{ref}+\alpha_{cor}$, the error signal $\Delta\alpha$ being always kept by the pilot as closely as possible to zero. This track coincides then with the reference locating line. The input signals of the radio navigation receiver 1 depend during this control stage on the motion characteristics of the ship 7, indicated in FIG. 1 by a block 9. These characteristics are influenced by the controllability of the ship's course. Thus, a second loop is formed in the control circuit system, this loop including the radio navigation receiver 1.

The electrical output signals of the radio navigation receiver 1 may be in the form of two DC voltages of which one is proportional to the sine and the other to the cosine of the phase-angle. The locating line controller 2 is manually adjusted to the reference value $\phi_{ref}$ of the phase-angle by the knob 123 and, taking into account the measured actual value $\phi_{act}$ of the phase-angle, finds the correcting angle the latter being represented by the signal $\alpha_{cor}$ and fed into the signalling means 3 to be superposed therein on the adjusted reference course angle $\alpha_{ref}$. Suitable means described hereinafter are provided in order to obtain adaptation of the working cycle of the navigation receiver 1 and to ensure simple operation in conjunction with the signalling means 3. Furthermore, auxiliary units are provided for acoustic signalling and continuous registration of the locating line error $\phi_{ref} - \phi_{act}$. This is particularly advantageous in the case of automatic oceanic surveying.

It has been mentioned hereinabove that the signal $\alpha_{cor}$ represents an angle of correction. In fact, this signal includes the locating line error $\phi_{ref} - \phi_{act}$. Moreover, it includes an integral of this locating line error over the time or, in other words, a value which keeps growing as long as the locating line error is positive and keeps diminishing as long as the locating line error is negative. As a result, the correcting effect exerted on the automatic pilot by the locating line controller 2, whenever the ship departs from the selected locating line, keeps growing until the automatic pilot will have steered the ship back to the locating line. This will be explained by an example:

Let us assume that the track on which the ship travels fails to coincide with the selected locating line and extends parallel thereto. In this event, the true heading of the ship $\alpha_{act}$ corresponds to the selected heading $\alpha_{ref}$ of the ship. Therefore, $\alpha_{ref} - \alpha_{act}$ amounts to zero. However, the error signal $\alpha_{cor}$ supplied by the locating line controller 2 differs considerably from zero and has a positive or negative magnitude depending on whether the ship travels too close to the one or to the other of the two radio stations emitting the electro-magnetic waves. This error signal $\alpha_{cor}$ causes the pilot to change the heading of the ship in such a way as to steer the ship back to the locating line. Owing to the change of the heading of the ship, $\alpha_{ref} - \alpha_{act}$ will depart from zero and will act on the automatic pilot. This action, however, will be overridden by $\alpha_{cor}$ which is gradually growing, as the time passes. Not until the ship will have been steered back to the locating line and will have returned to the proper heading to stay on the locating line, will $\Delta\alpha$ become zero again.

An automatic pilot of the type including the gyroscopic indicator 8, signalling means differing from the signalling means 3 by the absence of an input for $\alpha_{cor}$, a control circuit 3a, a motor-operated steering gear 4 and the feed-back signaller 5 is old in the art and may be identical with that shown and described in the U.S. Pat. No. 3,517,285 issued on June 23, 1970. Therefore, a detailed description of the elements 3, 3a, 4, 5 and 8 is deemed dispensable herewith.

Figure 2:
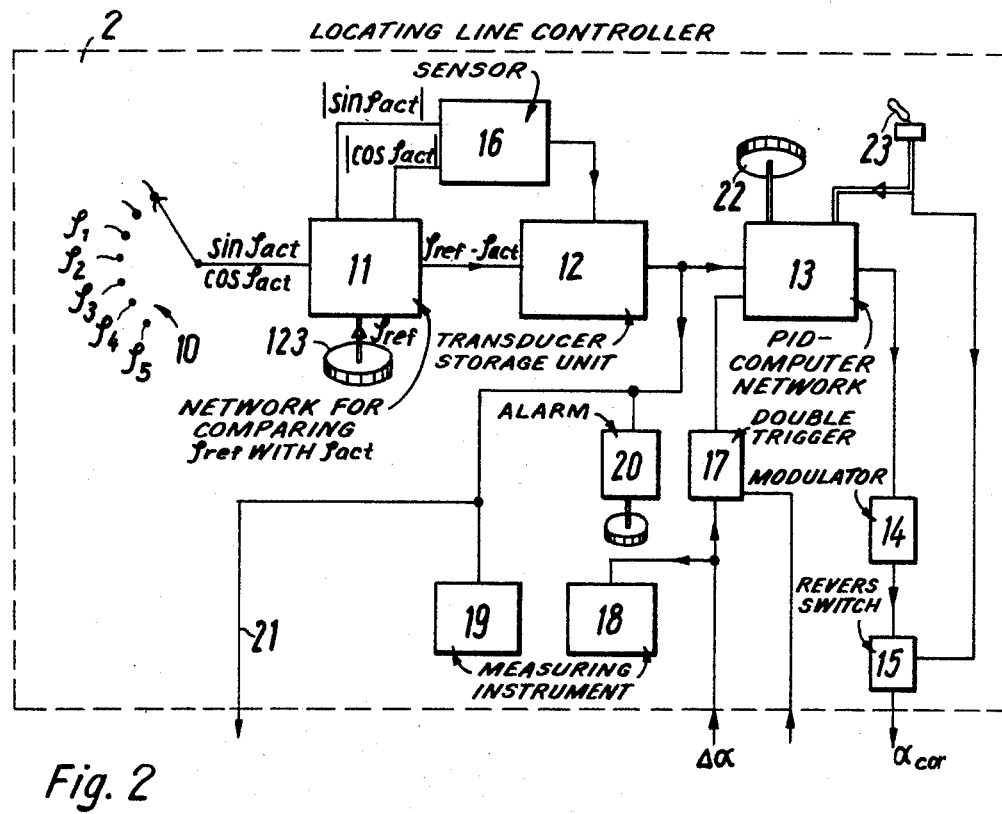
FIG. 2 is a block diagram of the units of the locating line controller.

The block diagram in FIG. 2 illustrates in detail the locating line controller 2. The latter includes a network 11 of reference circuits which compare the actual value $\phi_{act}$ supplied by the radio navigation receiver 1 with its reference value $\phi_{ref}$. Details of this network will be described in relation to FIGS. 3 and 4. The input end of the network 11 is connected to the arm of a channel selector switch 10, whose contacts are connected to the radio navigation receiver 1. The output end of the network 11 is connected to one of two input ends of a transducer-storage unit 12 whose output end is connected to the input end of a PID-computer network 13. The output end of the computer network 13 is connected through a modulator 14 to a reversing switch 15, the correcting signal $\alpha_{cor}$ for the reference value $\alpha_{ref}$ set in the signalling means 3 being supplied by that modulator through that switch. The network 11 supplies, in addition to the signal $\phi_{ref} - \phi_{act}$, two auxiliary signals of which one is proportional to the amount of sine $\phi_{act}$ and the other to the amount of cos $\phi_{act}$ disregarding the sign thereof. These two signals are fed into the input ends of a sensor 16 for approximative location. The output signal of the sensor 16 determines the operational condition of the transducer-storage unit 12. This because the latter either passes the output signal $\phi_{ref} - \phi_{act}$ of the network 11 on to its output end or it stores the signal which indicates the deviation of the ship from the locating line without reacting to variations of this signal.

To control the transducer-storage unit 12, the auxiliary signals are supplied to the unit 16 therein producing a control signal activating the unit 12 in dependence on approximative locating time. Methods for locating by radio are known in which the signal indicating a locating line has more than one interpretation and in which, therefore, approximative locating takes place within a certain time cycle. During these approximative locations, precise locating which supplies the signal $\alpha_{act}$ is interrupted for a short time. The object of the units 12 and 16 is to maintain during these interruptions the error control signal which is proportional to $\phi_{ref} - \phi_{act}$ in order to supply the signalling means 3 without interruption with the signal $\alpha_{cor}$. Thus, the output end of the transducer-storage unit 12 will always supply the error control signal $\phi_{ref} - \phi_{act}$.

The control error $\Delta\alpha$ is now obtained in the signalling means 3 as the difference between $\alpha_{act}$ — which has been supplied by the gyroscopic device 8 and the sum $\alpha_{ref}$ plus $\alpha_{cor}$. The signal $\Delta\alpha$ is not only supplied to the control circuit 3a but also to the locating line controller 2, entering into a double trigger 17, FIG. 2 provided therein whose output is fed into the second input end of the PID-computer network 13. The signal which is proportional to $\Delta\alpha$ is further connected to a measuring instrument 18 which indicates the course error. This indication is desirable for adjusting the apparatus to its optimum operational condition.

A further measuring instrument 19 which is connected to the output end of the transducer-storage unit 12 continuously indicates the deviation $\phi_{ref} - \phi_{act}$ from the locating line. An alarm signaller 20 is arranged in parallel to the instrument 19, the threshold value of the signaller being adjustable by hand. The signaller gives an alarm signal when the difference between $\phi_{act}$ and $\phi_{ref}$ becomes too great. Finally, the signal $\phi_{ref} - \phi_{act}$ can be fed through a line 21 to an instrument for continuously registering deviations of the locating line.

The sensitivity of the PID-computer network 13 can be adjusted by means of a rotatable knob 22. This is necessary in order to adapt the controller to the varying distances between locating lines. There is further provided a switch 23 which is set in accordance with the direction of the course and influences both the PID-computer network 13 and the reversing switch 15. This takes into account whether the direction of any increase of the phase-angle $\phi_{act}$ is towards port or starboard while the ship is in motion.

In the following the circuits of the units 11, 12, 13, 16 and 17 of the locating line controller 2 are described in detail.

Figure 3:
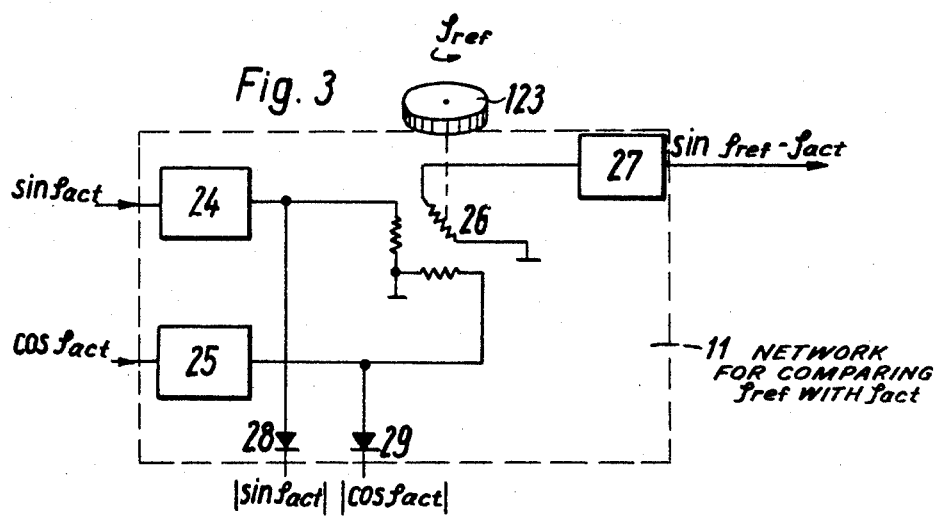
FIG. 3 is a wiring diagram of the network of the reference circuits diagrammatically indicated in FIG. 2 by block 11.

FIG. 3 shows an example of an embodiment for the reference network 11. This network consists here of two modulators 24, 25, a resolver 26, a demodulator 27 and two diodes 28, 29. The input signals which correspond to sine $\phi_{act}$ and cos $\phi_{act}$ are passed through the channel selector switch 10 pass through the two modulators 24, 25 respectively and feed thereafter the two primary windings respectively of the resolver 26. Secured to the shaft of the resolver is the rotatable knob 123 for adjusting the reference value $\phi_{ref}$. The secondary resolver coil which is mounted on the shaft is connected to the input end of the demodulator 27 whose output end supplies a signal proportional to sine ($\phi_{ref} - \phi_{act}$). This signal represents the control error fed into the transducer-storage unit 12. The output voltages of the two modulators 24, 25 yield two auxiliary voltages through being applied to the diodes 28, 29 respectively. The two auxiliary output voltages are fed into sensor 16 for sensing the timing of approximative location. One of the auxiliary voltages is proportional to the amount of sine $\phi_{act}$ and another to the amount of cos $\phi_{act}$ disregarding the sign.

Figure 4:
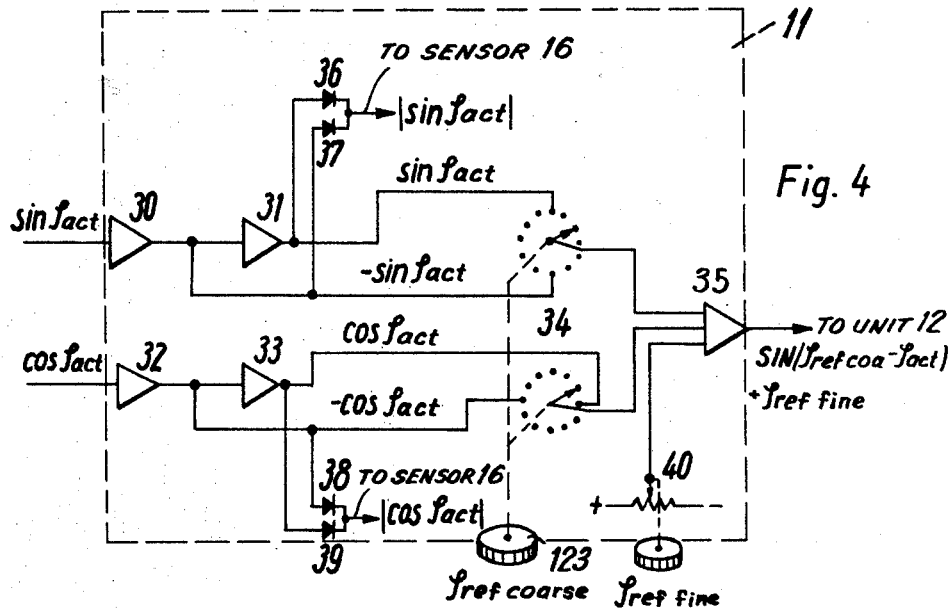
FIG. 4 is a wiring diagram of another embodiment of the network of reference circuits of FIG. 3.

FIG. 4 shows a second embodiment of the network 11. This embodiment has the advantage of not requiring the expensive resolver. In the case of this embodiment the network consists of four inverter amplifiers 30, 31, 32 and 33 of which pairs 30, 31 and 30, 33 respectively are in series and control each tier of a two-tier selector switch 34. This switch is programmed similar to a sine-cosine potentio-meter. The output voltages of the switch 34 are added in a summing amplifier 35 to the output voltages of a potentio-meter 40. This potentio-meter can be adjusted very exactly by hand to $\phi_{ref}$ fine. The output end of the amplifier 35 supplies the signal which is fed into the transducer-storage unit 12.

The operation of the reference circuits shown in FIG. 4 is as follows:

Adjustment of the selector switch 34 to the reference value $\phi_{ref}$ is effected by the knob 123 in a coarse manner. By means of resistors not shown here, the first tier of the switch 34 is programmed similar to a sine potentiometer and the second tier similar to a cosine potentiometer. Exact adjustment of the reference value $\alpha_{ref}$ is effected by the potentiometer 40. Signals which are proportional to sine $\phi_{act}$ and cos $\phi_{act}$, respectively, are converted by the amplifiers 30 – 33 to signals sine $\phi_{act}$ − sine $\phi_{act}$ cos $\phi_{act}$) and − cos $\phi_{act}$ with the impedance changing at the same time. These four signals produce at the output end of the amplifier 35 a signal proportional to (sine $\phi_{ref\ coarse} - \phi_{act}) + \phi_{ref\ prec}$. With the steps of the switch 34 being sufficiently close together and for small control errors ($\phi_{ref} - \phi_{act}$), this output voltage is proportional with adequate accuracy to the term ($\phi_{ref\ coarse} + \phi_{ref\ fine} - \phi_{act}$).

Two auxiliary signals are supplied to the sensor 16 by each of the two pairs of diodes 36, 37 and 38, 39 respectively. Each of the diodes of the pair 36, 37 is connected to the output end of one of the inverter amplifiers 30, 31. Each of the diodes of the pair 38, 39 is connected to the output end of one of the inverter amplifiers 32, 33. The cathodes of each pair of diodes are connected to each other.

Figure 5:
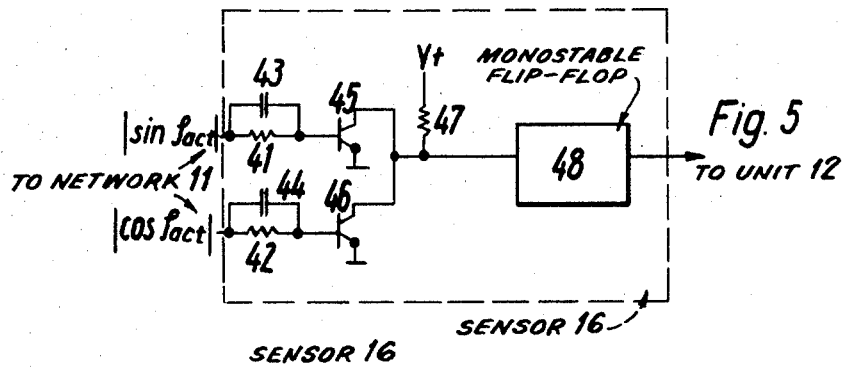
FIG. 5 is a wiring diagram of the approximative locating sensor diagrammatically indicated in FIG. 2 by block 16.

FIG. 5 shows an embodiment of the sensor 16 for approximative locating. During approximative locating, which takes only a short time the voltages of the two auxiliary signals supplied by the reference network 11 drop by a certain percentage. This drop is utilized for influencing the transducer-storage unit 12 by means of the sensor 16. The auxiliary signals supplied by the network 11 are passed through resistance-capacitor-networks 41, 43 and 42, 44 respectively and then through transistors 45, 46 respectively. The two transistors have a common collector-resistor 47. A monostable flip-flop 48 is connected to the collectors of the transistors. If the voltages of the two auxiliary signals drop simultaneously the two transistors 45, 46 are non-conductive, with the result that the collector resistor 47 pulls up the common collector voltage. At the same moment, the output of the flip-flop 48 is reversed, but returns after a definite time to its first condition. Monostable flip-flops are known in themselves, and there is no need to illustrate and describe them in detail.

Figure 6:
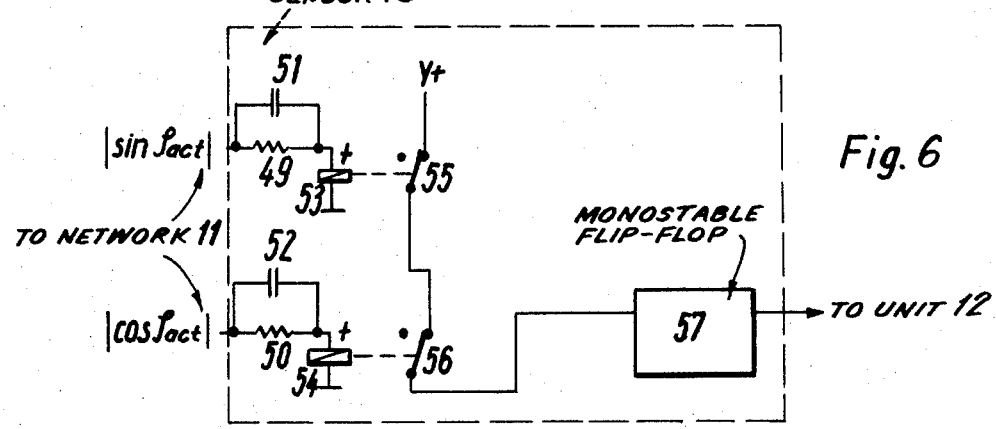
FIG. 6 is a wiring diagram of another embodiment of the sensor of FIG. 5.

Another embodiment of the sensor 16 for approximative locating is illustrated in FIG. 6. As shown therein, two resistor-capacitor-networks 49, 51 and 50, 52 are connected to relay coils 53, 54 respectively, the contacts 55 and 56 of these relays being arranged in series and controlling a monostable flip-flop 57. The relay coils are polarized. If the voltages of the two auxiliary signals supplied by the reference network 11 drop simultaneosuly, the two relay contacts change their positions. A fixed voltage is thereby applied to the input end of the flip-flop 57 with the result that the output of the flip-flop changes its condition. After the lapse of a certain time, the output end returns to its original condition.

It is possible that during normal control operations, only one of the transistors 45, 46 or of the relay contacts 55, 56 are switched. However, as under normal control conditions the sine and the cosine of the measured phase-angle can never drop simultaneosuly, the monostable flip-flop can change its condition only in response to signals of approximative locating.

FIG. 7 shows an embodiment of the transducer-storage unit 12. In the case of this embodiment the coil 58 of a relay is controlled from sensor 16 through a line 63, and the contact 59 of that relay either passes the signal supplied by the reference network 11 along a line 65 to the capacitor 60 or disconnects the line from that capacitor. A transistor 61, together with a resistor 62, is connected to capacitor 60. If the unit operates as a transducer, the contact 59 is closed. The capacitor is then charged to the input voltage of the signal. The transistor 61 and the resistor 62 serve merely as an impedance changer to ensure that the capacitor 60 is not over-charged. If the unit 12 operates as a storage-unit, the contact 59 is open. The capacitor 60 retains then its charge as there is virtually no discharge through resistor 61. Thus, the voltage at the output end 64 of the unit 12 connected to 13, 19, 20 and 21 remains unchanged.

FIG. 8 illustrates another embodiment of the transducer-storage unit 12. The unit includes here an operational amplifier 71, connected to two resistors 68, 69 and to a capacitor 70 in the manner shown in FIG. 8, and a relay coil 66 which is energized from the sensor 16 through a line 72 and whose contact 67 is arranged between two lines of which one connects the two resistors 68, 69 to each other, whilst the other line connects the capacitor 70 to the input end of the operational amplifier 71. When the unit 12 operates as a transducer and the contact 67 is consequently closed, the voltage of the signal supplied from the network 11 through a line 74 is applied with a slight delay, conditioned by the capacitor 70 and with its sign reversed to the output line 73 of the amplifier 71. If the unit 12 operates as a storage unit and the contact 67 is consequently open, the output of the amplifier 71 remains unchanged because of the feedback connection of the capacitor, even if the input voltage in line 74 changes.

The two embodiments shown in FIGS. 7 and 8 can be modified in many respects, e.g. by replacing the relays through semi-conductor circuit elements, such as transistors.

FIG. 9 shows an embodiment of the PID-computer network 13. It contains an operational-amplifier 75 which is connected to two resistors 76, 77 and two capacitors 78, 79 in the manner shown in FIG. 9, the network further includes an adjustable potentiometer 80 in series with the amplifier 75 and means for adjusting in both directions the initial integration component of the network, the means comprising two relays 83, 86, with two normally open contacts 84, 85, and 87, 88 respectively and a common resistor 89. The potentiometer 80 is connected to the input end 81 of the PID-computer network 13, the input end being also connected to the transducer-storage unit 12.

The above-described circuits convert the voltage at the input end 81 into a voltage at the output end 82, the output voltage consisting of three components:

1. a component (P) proportional to the input voltage,
2. a component (I) proportional to the time integral of the input voltage, and
3. a component (D) proportional to the differential quotient with respect to time of the input voltage.

The sensitivity of the PID-network can be adjusted by means of the knob 22 which is connected to the potentiometer 80.

When the locating line controller 2 which includes the above-described PID-network is made operative, the initial value of the integration component has to be adjusted. To this end, the voltage at the output end 82 of the operational amplifier 75 must be changed in such a manner that the voltage which represents the error signal $\Delta\alpha$ becomes zero. If this voltage is not equal to zero, the relay coils 83 or 86 are energized, whereby either the contacts 84, 85 or the contacts 87, 88 are closed. Closure of the contact 84 or 87 bridges the resistors 76, 77 and the capacitor 78. If contact 85 is closed, a current producing a negative speed of change of the voltage at the output end 82 of the operational amplifier 75 is passed through the resistor 89 on to the input end of the operational amplifier 75. If the contact 88 is closed, current is fed into the input end of the operational amplifier 75, said current effecting a positive speed of change at the output end 82 of the operational amplifier. The coils of the two relays 83 and 86 are connected to lines 92, 93 respectively. Connected to these lines by a reversing switch 96 are two lines 94, 95 which lead to the double trigger 17 of FIG. 2. The switch 96 can be reversed by the switch 23, FIG. 2. The switch 96 connects in one position line 94 to line 92 and line 95 to line 93. In the other position, the switch 96 connects line 94 to line 93 and line 95 to line 92. The lines 94, 95 carry auxiliary electric signals supplied by the double trigger 17, as shown in FIG. 10.

The double trigger may consist, for example, of two Schmitt triggers 97, 98 which are energized by the signal $\Delta\alpha$. Schmitt triggers are well known and need therefore not to be described. The output ends 94, 95 of the double trigger can be blocked through two AND gates 99, 100 by a monostable flip-flop 101, controlled by a control selector switch 102.

When the signal $\Delta\alpha$ supplied by the signalling means, has a positive sign, the double trigger 97, 98 applies a voltage to the line 94. When the sign of $\Delta\alpha$ is negative, a voltage is applied to the line 95. When the signal $\Delta\alpha$ is zero, no voltage is applied to lines 94 and 95. The control selector switch 102 can be set by hand for manual or automatic operation. The auxiliary input end, provided in the double trigger 17 and connected to the switch 102, has the effect that the relay coils 83 and 86 can be energized for a very short period of time only, e.g. for one second, after the locating line controller 2 has been put into operation. The output voltage of the trigger 97 is high when the signal $\Delta\alpha$ exceeds a positive threshold value. The output voltage of the trigger 98 is high when the signal Δα exceeds a small negative threshold value. The AND gates 99, 100 have the effect that the output voltages of the triggers can only be applied to the lines 94, 95 if the output voltage of the monostable flip-flop 101 is high at the same time. The flip-flop has the effect of limiting the period during which the output voltage is high, after the switch 102 has been set for automatic operation. After this period, the adjustment of the integration component in the PID network 13 of FIG. 9 to its initial value is terminated, and the normal control operation can begin.

The modulator 14 of FIG. 2 is required, if the signal corresponding to the correcting angle $\alpha_{cor}$ is to be superposed with the aid of a resolver to the value $\alpha_{ref}$ which is set in the heading selector by means of the rotatable knob shown in FIG. 1. This superposition may be carried out by other means, e.g. with the aid of a potentiometer. In this case, DC voltage can be used for that purpose and the modulator 14 becomes unnecessary. In the case of a heading selector with digital feed of $\alpha_{ref}$, the output voltage of the PID-computer network 13 can be applied, as known, through an analogue-digital-converter. The correcting angle represented by the signal $\alpha_{cor}$ may be added in a known manner in digits to the reference course angle $\alpha_{ref}$.

While our invention has been described with reference to a few detailed embodiments thereof, it is to be understood that it is in no way restricted or limited to the details of such embodiments but is capable of numerous modifications within the scope of the appended claims.

What we claim is:

1. In a control system for a ship including a position-fixing radio navigation receiver of the type in which phase angles between two frequencies received from spaced transmitter stations are measured and including an electrical automatic pilot of the type in which an electrical error signal Δα representing the course error of the ship is produced by signalling means connected with a gyroscopic indicator indicating the heading of the ship and with a selector adjustable in accordance with the desired heading $\alpha_{ref}$ and controls a trigger circuit causing the latter to so control a motor-operable steering gear for actuating the rudder of the ship as to minimize said error signal Δα, a locating line controller comprising (a) an electrical network connected to said receiver, said network having means adjustable in accordance with a desired value $\phi_{ref}$ of said location signal and means for comparing said desired value $\phi_{ref}$ with said location signal $\phi_{act}$ to produce a location-error signal $\phi_{ref} - \phi_{act}$ at the output of said network, (b) a transducer-storage unit having an input connected with the output of said network, (c) an sensor for approximative location having an input connected to said network to be controlled thereby and having an output connected to said transducer-storage unit to control same, and (d) a PID computer network having a first input, a second input and an output and including means for adapting its sensitivity, said first input being connected to the output of said transducer-storage unit and said output being connected to said signalling means for supply thereto of a correcting signal $\alpha_{cor}$, said signalling means including means for superimposing said correcting signal $\alpha_{cor}$ to the desired heading $\alpha_{ref}$ set up in said selector thereby causing said signalling means to produce an error signal Δα representing the difference of the heading $\alpha_{act}$ from the sum of the desired heading $\alpha_{ref}$ plus said correcting signal $\alpha_{cor}$, the output of said signalling means being connected to said second input of said PID computer network to thereby automatically adjust the initial value of the integration component in said PID computer network, (e) a channel selector switch including a set of contacts connected to said receiver for supplying at its output a control signal corresponding to sine $\phi_{act}$ and a control signal corresponding to cos $\phi_{act}$, said electrical network including electronic means having outputs connected to said sensor (c), said electronic means producing a first auxiliary signal proportional to | sine $\phi_{act}$ | and a second auxiliary signal proportional to | cos $\phi_{act}$ | and supplying these auxiliary signals to said sensor, said transducer-storage unit (b) including storing means for storing said location error signal.

2. A location line controller as claimed in claim 1 in which said electrical network comprises a pair of modulators each having an input connected to said receiver for receiving locating signals and an output, a resolver having inputs connected to the outputs of said modulators and an output for delivering an output signal, a demodulator having an input connected to the output of said resolver and an output connected to said transducer-storage, manually adjustable means connected with said resolver for common rotation therewith to an adjusted position representing the desired location, and a pair of diodes having inputs connected to the outputs of said modulators and having outputs connected to the input of said sensor.

3. A location line controller as claimed in claim 1 in which said electrical network comprises a two-tier selector switch programmed similarly to a sine-cosine-potentiometer, two pairs of inverter amplifiers, the amplifiers of each pair being connected in series and connected with one tier of said selector switch to control same, a manually adjustable potentiometer, a summing amplifier connected with said selector switch and with said potentiometer to add the output voltages of said selector switch and of said potentiometer to form the output signal of said network, and two pairs of diodes, each diode being connected to the output of one of said reversing amplifiers, the common output of each of said pairs of diodes being connected to said sensor to supply auxiliary signals thereto.

4. A location line controller as claimed in claim 1 in which said sensor comprises a pair of resistor-capacitor-networks, a pair of transistors each connected to one of said resistor-capacitor-networks, a collector resistor common to said transistors and connected therewith, and a monostable flip-flop having an input connected with said pair of transistors to be controlled thereby.

5. A location line controller as claimed in claim 1 in which said sensor comprises a pair of resistor-capacitor-networks, a pair of relay coils, each relay coil being connected to one of said resistor-capacitor-networks, a monostable flip-flop having an input, and a pair of contacts arranged in series with each other and with the input of said monostable flip-flop, each contact being controlled by one of said relay coils.

6. A location line controller as claimed in claim 1 in which said transducer-storage unit having an input comprises a relay coil connected with said sensor to be controlled thereby, a contact controlled by said coil, a transistor and a capacitor, said contact being arranged to connect or disconnect the input of said transducer-storage unit with or from said capacitor and said transistor to control the latter, said transistor being arranged to control the connection of said switch with said PID-computer.

7. A location line controller as claimed in claim 1 in which said transducer-storage unit having an input comprises an operational amplifier, two resistors and a capacitor connected with said operational amplifier, a relay coil connected with said sensor for energization thereby, a relay contact coordinated to said relay coil for control thereby, a pair of conductors of which one connects said two resistors to each other, while the other connects said capacitor to the input end of said operational amplifier, said relay contact being arranged between said two conductors.

8. A location line controller as claimed in claim 1 in which said PID-computer network comprises an operational amplifier, two resistors and two capacitors coordinated to and connected with the same, an adjustable potentiometer arranged in series with said operational amplifier and means for adjusting the integration component of said PID-computer network in both directions, said means consisting of a pair of relays each provided with a pair of normally open contacts and of a resistor, said contacts being so connected with a positive potential, with a negative potential and with said last-mentioned resistor as to apply said potentials selectively to said operational amplifier.

9. A location line controller as claimed in claim 8 further comprising a double trigger, a selector switch, a monostable flip-flop arranged to block the outputs of said double trigger and energized by said selector switch, a pair of AND-gates having their inputs connected with said flip-flop and said double trigger and having their outputs connected with the coils of said two relays included in said means for adjusting the integration component.

* * * * *